(No Model.)
J. THOMPSON & V. V. SOHONI.
HUMIDIFIER.
No. 591,576. Patented Oct. 12, 1897.
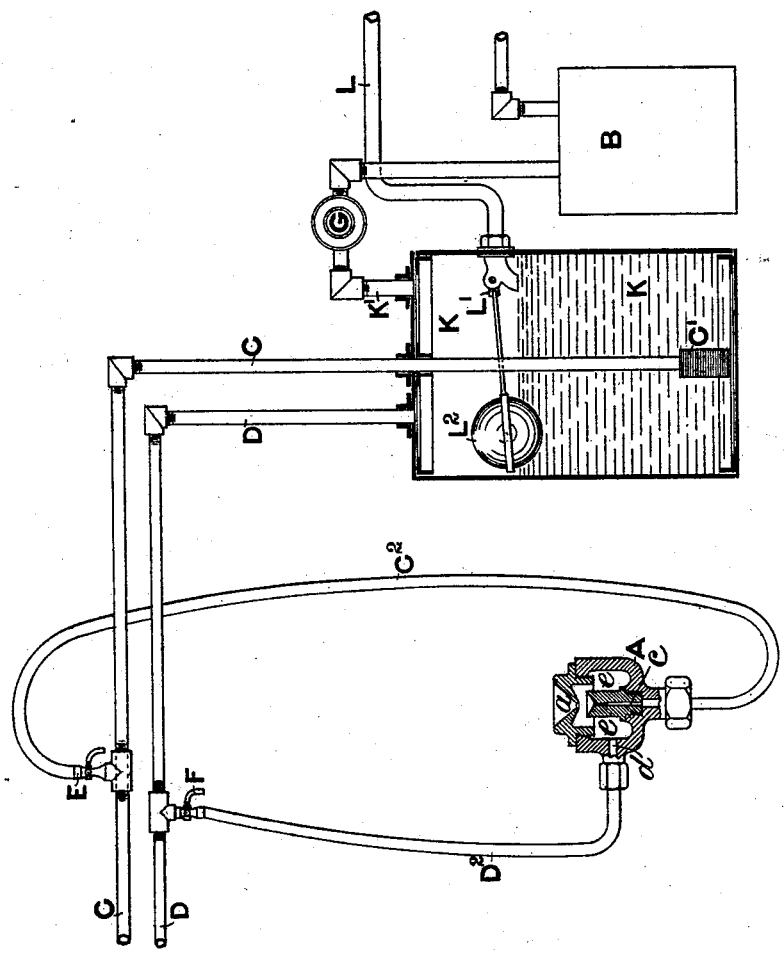

United States Patent Office.

JAMES THOMPSON, OF PAREL, AND VISHNOO VAMANA SOHONI, OF THAKURDWAR GIRGAUM, BOMBAY, INDIA.

HUMIDIFIER.

SPECIFICATION forming part of Letters Patent No. 591,576, dated October 12, 1897.

Application filed December 8, 1896. Serial No. 614,919. (No model.)

*To all whom it may concern:*

Be it known that we, JAMES THOMPSON, a resident of Morarji Goculdas Mills, Parel, and VISHNOO VAMANA SOHONI, a resident of Zaubas Wadi, Thakurdwar Girgaum, Bombay, India, subjects of the Empress of India, have invented certain Improvements in Humidifiers, of which the following is a specification.

Our said invention relates to improvements in the apparatus known as "humidifiers" and used for imparting additional moisture to the air in rooms—such as, for example, in textile-factories.

In its main features our said invention consists of a spray-producing apparatus to which air and water are supplied from a common closed reservoir, whence they issue at the same pressure.

The accompanying drawing, which is an elevation partly in section, is hereinafter referred to for the purpose of more clearly describing the invention.

K is a closed receptacle or reservoir whence the air and water for the spray-producing apparatus issue. Air is introduced to the reservoir through the pipe K' either directly from an air-compressor or from an air vessel B. In the latter arrangement the air may be pumped into the vessel B at a pressure of, for example, thirty-five to forty pounds or more on the square inch. A reducing-valve G is interposed between the air vessel B and the air and water reservoir K for the purpose of reducing the pressure in the latter to about fifteen or twenty pounds per square inch, which we find to be a suitable working pressure. Water is supplied to the reservoir K from a suitable source having a head or pressure sufficient to feed the water against the internal pressure in the reservoir K.

L is the water-supply pipe to the reservoir K. For automatically controlling the supply of the water an ordinary ball-valve L' is used, which opens when the floating ball L², connected therewith, sinks below a predetermined level.

C and D are respectively water and air mains provided with cocks E and F. On the latter cocks being opened air will flow along the main D, while water will pass through the strainer C' along the main C. The cocks E and F are connected by branch pipes $C^2 D^2$ (indicated by dotted lines in the drawing) to the spray-producing apparatus.

By the arrangement just described the air and water will reach the spray-producing apparatus at the same pressure.

The spray-producing apparatus consists of a casing A, which forms a chamber $e$ around a water-nozzle $c$, having a hollow conical outlet. The chamber $e$ is closed by a cap $a$, having a conical aperture in line with that of the water-nozzle. The air reaching the chamber $e$ through the air-inlet $d$ meets the water in the conical outlet of the water-nozzle, and in passing through the cone of the cap the rush of air breaks up and carries with it the water. As it issues from the conical aperture of the cap the expansion of the air separates the particles of water, and by preventing their coalescence into drops obviates a serious defect to which some forms of humidifier are liable.

Any desired number of spray-producing apparatus may be supplied by the mains C D, and they may be so arranged as to discharge directly into the room or into an air-supply shaft, as may be most convenient.

What we claim as our invention, and desire to secure by Letters Patent, is—

1. In a spray-producing apparatus, the combination of a water-nozzle having a conical outlet with an outlet for air and water having a conical aperture in line with that of the water-nozzle, a closed air and water reservoir, and communications between the said reservoir and the said nozzle and outlet substantially as set forth.

2. The combination with an air and water nozzle of a closed air and water reservoir communicating therewith for obtaining and maintaining an equal pressure of the air and water substantially as set forth and shown.

In testimony whereof we have signed our names to this specification in the presence of two subscribing witnesses.

JAMES THOMPSON.
VISHNOO VAMANA SOHONI.

Witnesses:
JEHARGIN M. RUTNAGUE,
GUMANTRAS ANANDRO.